(12) United States Patent
Wu et al.

(10) Patent No.: US 9,380,359 B2
(45) Date of Patent: Jun. 28, 2016

(54) METHOD AND A DEVICE OF SERVICE MIGRATION IN AN AUTOMATICALLY SWITCHED OPTICAL NETWORK

(75) Inventors: Jianhong Wu, Shenzhen (CN); Bin Li, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 414 days.

(21) Appl. No.: 13/140,283

(22) PCT Filed: Dec. 18, 2009

(86) PCT No.: PCT/CN2009/075712
§ 371 (c)(1),
(2), (4) Date: Jun. 16, 2011

(87) PCT Pub. No.: WO2011/003260
PCT Pub. Date: Jan. 13, 2011

(65) Prior Publication Data
US 2011/0255868 A1    Oct. 20, 2011

(30) Foreign Application Priority Data
Jul. 7, 2009 (CN) .......................... 2009 1 0158341

(51) Int. Cl.
H04Q 11/00 (2006.01)
(52) U.S. Cl.
CPC .................................. *H04Q 11/00* (2013.01)
(58) Field of Classification Search
None
See application file for complete search history.

(56) References Cited

U.S. PATENT DOCUMENTS 6,665,295 B1 * 12/2003 Burns ................ H04L 12/5601
370/389
7,287,081 B1 * 10/2007 Deboer ............... H04L 41/0663
370/217

(Continued)

FOREIGN PATENT DOCUMENTS

| CN | 101198077 (A) | 11/2008 |
| CN | 101299893 (A) | 11/2008 |
| CN | 101325814 (A) | 12/2008 |

OTHER PUBLICATIONS

International Search Report for International Application No. PCT/CN2009/075712, mailed Apr. 15, 2010.

(Continued)

*Primary Examiner* — Adnan Baig
(74) *Attorney, Agent, or Firm* — Clark & Elbing LLP

(57) ABSTRACT

A method and a device of service migration in an automatically switched optical network are disclosed in the present invention, and the method includes: when receiving a migration indication message, a migration node sending an cross information checking request to a transmission plane (S101); when receiving a cross information checking success message, the migration node performing a slot resource migration (S102); and the migration node determining whether it is the destination node of the present service migration, if it is determined to be yes, an cross connection migration is performed directly, otherwise, the cross connection migration is performed after the indication signaling, which is sent by a downstream node and carries a cross connection migration scene, is received (S103). The present invention improves the reliability of the migration from PC to SPC, and further ensures the reliability of the migration by a strict state control and state refresh mechanism.

16 Claims, 7 Drawing Sheets

(56) References Cited

U.S. PATENT DOCUMENTS

2006/0203720 A1* 9/2006 Kano .......................... 370/228
2006/0268944 A1* 11/2006 Xu ..................... H04Q 11/0062
　　　　　　　　　　　　　　　　　　　　370/351

OTHER PUBLICATIONS

"Terms and definitions for automatically switched optical networks (ASON)," International Telecommunication Union, ITU-T Recommendation G.8081/Y.1353, Jun. 2004 (48 pages).

* cited by examiner

METHOD AND A DEVICE OF SERVICE MIGRATION IN AN AUTOMATICALLY SWITCHED OPTICAL NETWORK

CROSS-REFERENCE TO RELATED APPLICATIONS

This application is the U.S. National Stage filing under 35 U.S.C. §371 of International Application No. PCT/CN2009/075712, filed Dec. 18, 2009, which claims benefit of Chinese Patent Application No. 200910158341.0, filed Jul. 7, 2009.

FIELD OF THE INVENTION

The present invention relates to the communication field, and especially to a method and a device of service migration in an Automatically Switched Optical Network (ASON).

BACKGROUND OF THE INVENTION

With the development of network technology and the substantial increase of the communication capacity of a network, people have higher demands on the performances of a transport network. An optical network is endowed with intelligence attributes by adding the protocol method of automatic control at an optical field endows. It is hoped that the architecture of the network can be more flexible, the management of the network can be flexible and unified, the use ratio of bandwidth can be higher, survivability and extensibility can be stronger, and a dynamic connection and an intelligent scheduling mode can be provided. Therefore, the ASON arises at the historic moment.

The ASON is referred to as an optical network that automatically carries out an optical connection switching function with the assistance of routing and signaling protocols, differs from a traditional transport network by adding an independent control plane, achieves intelligent functions such as an automatic discovery of resource(s), a routing selection, a dynamic resource allocation, and a failure recovery in the optical network via related protocols such as Generalized Multi-Protocol Label Switching (GMPLS), and substantially improves the reliability and survivability of the optical network.

Since the ASON is put forward during the process of developing from the traditional optical network to the intelligent optical network, it is required that the ASON can not only manage services in the intelligent optical network, Soft Permanent Connection (SPC) and Switched Connection (SC), but also manage services in the traditional optical network, Permanent Connection (PC). In an actual operation network, the PC service(s) and the SPC service(s) can exist at the same time, and the operators will determine whether to configure the intelligence attributes for the optical network according to actual demands, which arises the demands that how to manage PC services in the ASON.

The PC service(s) to the SPC service(s) means that the PC service(s) directly managed by a management plane is included into the management scope of an ASON control plane in a precondition of ensuring that the original services are not interrupted, which endows the PC service(s) with the intelligence attributes, such as an automatic recovery attribute and a protection attribute, so that the maintenance of services can be more convenient. It needs to introduce signal states of the control plane into the PC service(s) and migrate the management authority of cross and network resources occupied by the services to the control plane.

SUMMARY OF THE INVENTION

The present invention provides a method and a device of service migration in an automatically switched optical network, which achieves the migration of a Permanent Connection managed directly by a management plane to the management scope of a control plane on the precondition that original services are not interrupted.

The present invention provides a method of service migration in an automatically switched optical network, comprising:

Step 1: when receiving a migration indication message, a migration node sending a cross information checking request to a transmission plane;

Step 2: when receiving a cross information checking success message, the migration node performing a slot resource migration; and Step 3: the migration node judging whether itself is a destination node of the present service migration; wherein if it is determined to be yes, a cross connection migration is performed directly; otherwise, the cross connection migration is performed after an indication signaling, which is sent by a downstream node and carries a cross connection migration scene, is received.

In the above, when the migration node is a source node, the migration indication message is a migration command sent by a network administrator, wherein the migration command carries routing information; and when the migration node is an intermediate node or the destination node, the migration indication message is an indication signaling which is sent by an upstream node and carries a slot resource migration scene.

Further, when the migration node is the source node, before the cross information checking request is sent to the transmission plane, the method also comprises: inquiring whether the routing information in the migration indication messages is correct; wherein if it is determined to be yes, a creation of a control plane signaling is started.

When the migration node is the source node or the intermediate node, after the slot resource migration is performed, the method also comprises: sending the indication signaling with a slot resource migration scene to the downstream node.

When the migration node is the source node, the migration node reports a migration success message to a management plane after the cross connection migration is performed; and when the migration node is the intermediate node or the destination node, the migration node sends the indication signaling with the cross connection migration scene to the upstream node after the cross connection migration is performed.

Specifically, after the Step 3 the method also includes:

the migration node changing the current migration scene to a connection establishment scene.

The present invention also provides a migration node, comprising:

a checking request distributing means, configured to send a cross information checking request to a transmission plane when receiving a migration indication message;

a slot resource migration means, configured to perform a slot resource migration when receiving an cross information checking success message; and a cross connection migration means, configured to judge whether the migration node is a destination node of the present service migration; wherein if it is determined to be yes, a cross connection migration is performed directly; otherwise, the cross connection migration is performed after the indication signal, which is sent by a downstream node and carries a cross connection migration scene, is received.

In the above, when the migration node is the source node, the migration indication message received by the checking request distributing means is a migration command sent by a network administrator, wherein the migration command carries routing information; and when the migration node is the intermediate node or the destination node, the migration indication message received by the checking request distributing means is an indication signaling which is sent by an upstream node and carries a slot resource migration scene.

Specifically, the checking request distributing means is also configured to, when the migration node is the source node, inquire whether the routing information in the migration indication message is correct before sending the cross information checking request to the transmission plane; wherein if it is determined to be yes, a creation of a control plane signaling is started;

the slot resource migration means is also configured to, when the migration node is the source node or the intermediate node, send an indication signaling with a slot resource migration scene to a downstream node after the slot resource migration is performed; and the cross connection migration means is also configured to, when the migration node is the source node, report a migration success message to a control plane after the cross connection migration is performed; and the cross connection migration means is also configured to, when the migration node is the intermediate node or the destination node, send an indication signaling with a cross connection migration scene to an upstream node after the cross connection migration is performed.

Further, the migration node provided by the present invention also comprises:

a connection establishment scene refreshing means, configured to change the current migration scene to a connection establishment scene.

Compared with the prior art, the present invention has following advantages.

The method provided by the present invention can be well compatible with an ordinary signaling establishment process by using a standard connection establishment signaling to perform the service migration. It carries out respectively a cross checking, a slot migration and a cross migration during different signaling phases, which improves the reliability of the PC to the SPC; and the reliability of the migration is further ensured by a strict state control and state refresh mechanism.

BRIEF DESCRIPTION OF THE DRAWINGS

To describe more clearly the embodiments of the present invention or the technical solutions in the prior art, the drawings used to describe the embodiments or the prior art will be introduced briefly; and apparently, the drawings in the following description are only some embodiments of the present invention. For those skilled in the art, other drawings based on these drawings can also be obtained without creative work.

DETAILED DESCRIPTION OF THE PREFERRED EMBODIMENTS

The technical solutions in the embodiments of the present invention will be clearly and fully described with reference to the drawings in the embodiments hereinafter; apparently, the described embodiments are only some instead of all the embodiments of the present invention. On the basis of the embodiments of the present invention, all the other embodiments obtained by those skilled in the art without creative work shall belong to the protection scope of the present invention.

The present invention provides a method and a device of service migration in an automatically switched optical network, which realizes the migration of a permanent connection directly managed by a management plane to the management scope of a control plane without interrupting the original services and solves the problem in the prior art that a permanent connection in the ASON network cannot be migrated to a soft permanent connection.

Figure 1:
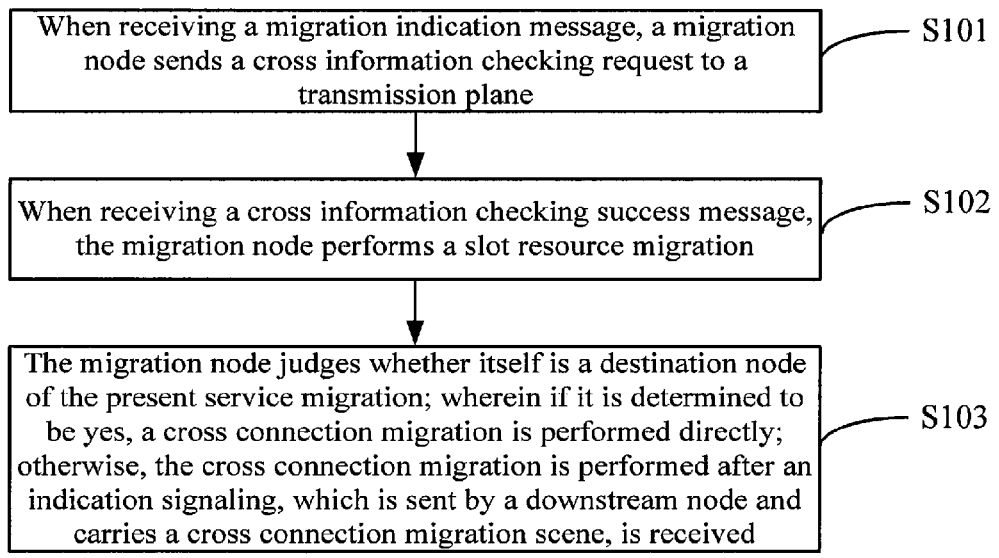
FIG. 1 is a flow chart of a method of service migration in an automatically switched optical network provided by the present invention.

Specifically, the present invention provides a method of service migration in an automatically switched optical network. As shown in FIG. 1, the method comprises the following steps.

Step S101: When receiving a migration indication message, a migration node sends a cross information checking request to a transmission plane.

In the above, when the migration node is a source node, the above migration indication message is a migration command sent by a network administrator, wherein the migration command carries routing information.

When the migration node is an intermediate node or a destination node, the above migration indication message is an indication signaling which is sent by an upstream node and carries a slot resource migration scene.

Further, when the migration node is the source node, it also performs the following operation: before sending the cross information checking request to the transmission plane, inquiring whether the routing information in the migration indication messages is correct; wherein if it is determined to be yes, a creation of a control plane signaling is started.

Step S102: When receiving a cross information checking success message, the migration node performs a slot resource migration.

Specifically, when the migration node is the source node or the intermediate node, the migration node also performs the following operation: sending the indication signaling with the slot resource migration scene to a downstream node after the slot resource migration is performed.

Step S103: The migration node judges whether itself is the destination node of the present service migration; wherein if it is determined to be yes, a cross connection migration is performed directly; otherwise, the cross connection migration is performed after an indication signaling, which is sent by the downstream node and carries a cross connection migration scene, is received.

During this step, when the migration node is the source node, the migration node reports the migration success message to a control plane after the cross connection migration is performed.

When the migration node is the intermediate node or the destination node, the migration indication message is an indication signaling, which is sent by an upstream node and carries the slot resource migration scene.

Specifically, the following operation is performed after this step: the migration node changing the current migration scene to a connection establishment scene.

The method provided by the present invention can be well compatible with an ordinary signaling establishment process by using a standard connection establishment signaling to perform a service migration. It carries out respectively a cross checking, a slot migration and a cross migration during different signaling phases, which improves the reliability of the PC to the SPC; and the reliability of the migration is further ensured by a strict state control and state refresh mechanism.

The specific realization process of a method of service migration in an automatically switched optical network provided by the present invention is described in details hereinafter by a preferred embodiment.

Specifically, a General standard Protocol routine is used in the embodiment of the invention to carry out a migration from PC to SPC in the automatically switched optical network, wherein the standard signaling can be an RSVP signaling or a CR-LDP signaling. The realization process of the present invention will be further described in details hereinafter based on RSVP-TE protocol.

In this embodiment, the migration process of each of the migration nodes is basically the same during the migration process from PC to SPC, but there are also some differences. Hereinafter the migration process of each of the migration nodes will be described in detail so as to explain the detailed realization process of the embodiment of the invention.

Figure 2:
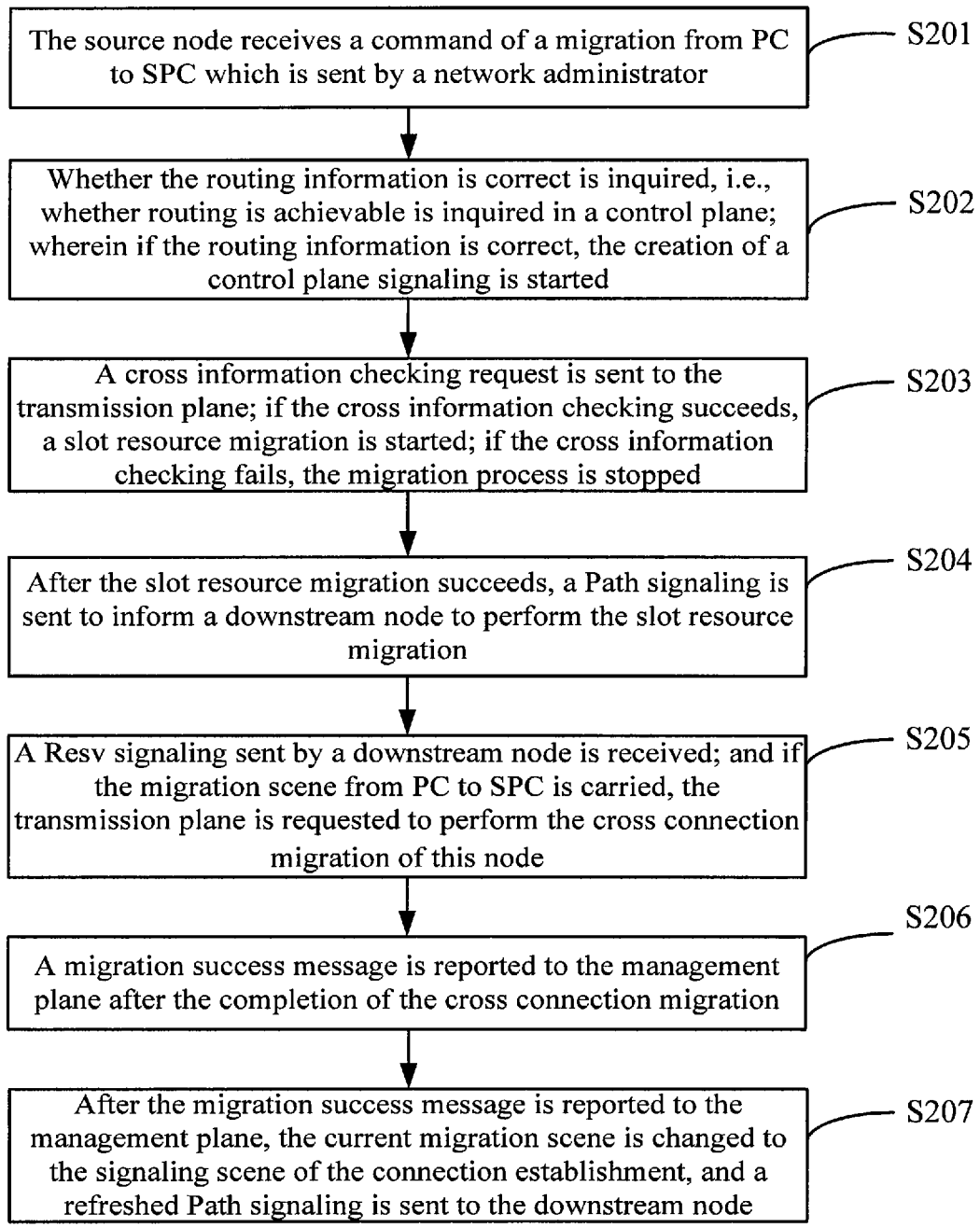
FIG. 2 is a flow chart of a method for a source node migrating a service in the embodiments of the present invention.

Specifically, as shown in FIG. 2, the migration process of a service source node specifically comprises the following steps.

Step S201: The source node receives a command of migration from PC to SPC which is sent by a network administrator, wherein the command carries routing information which further includes slot information.

Step S202: Whether the routing information is correct is inquired, i.e., whether the routing is achievable is inquired in a control plane; wherein if the routing information is correct, the creation of a control plane signaling is started.

Step S203: A cross information checking request is sent to the transmission plane; if the cross information checking succeeds, a slot resource migration is started; if the cross information checking fails, the migration process is stopped.

Step S204: After the slot resource migration succeeds, a Path signaling is sent to inform a downstream node to perform the slot resource migration, wherein the Path signaling carries a signaling scene of the slot resource migration from PC to SPC.

Step S205: it is monitored in real time whether a Resv signaling sent by a downstream node is received, and it is judged, according to the signaling scene carried in the Resv signaling, whether to perform a connection establishment or a cross connection migration; wherein if the signaling scene is the cross connection migration scene, the transmission plane is requested to perform the cross connection migration of this node.

In the above, when the Resv signal is received, it means that the migration of all downstream nodes has already been performed successfully.

Step S206: A migration success message is reported to the management plane after the completion of the cross connection migration.

Step S207: After the migration success message is reported to the management plane, the current migration scene is changed to the signaling scene of the connection establishment, and a refreshed Path signaling is sent to the downstream node; wherein the Path signaling carries the signaling scene of an ordinary connection establishment.

Figure 3:
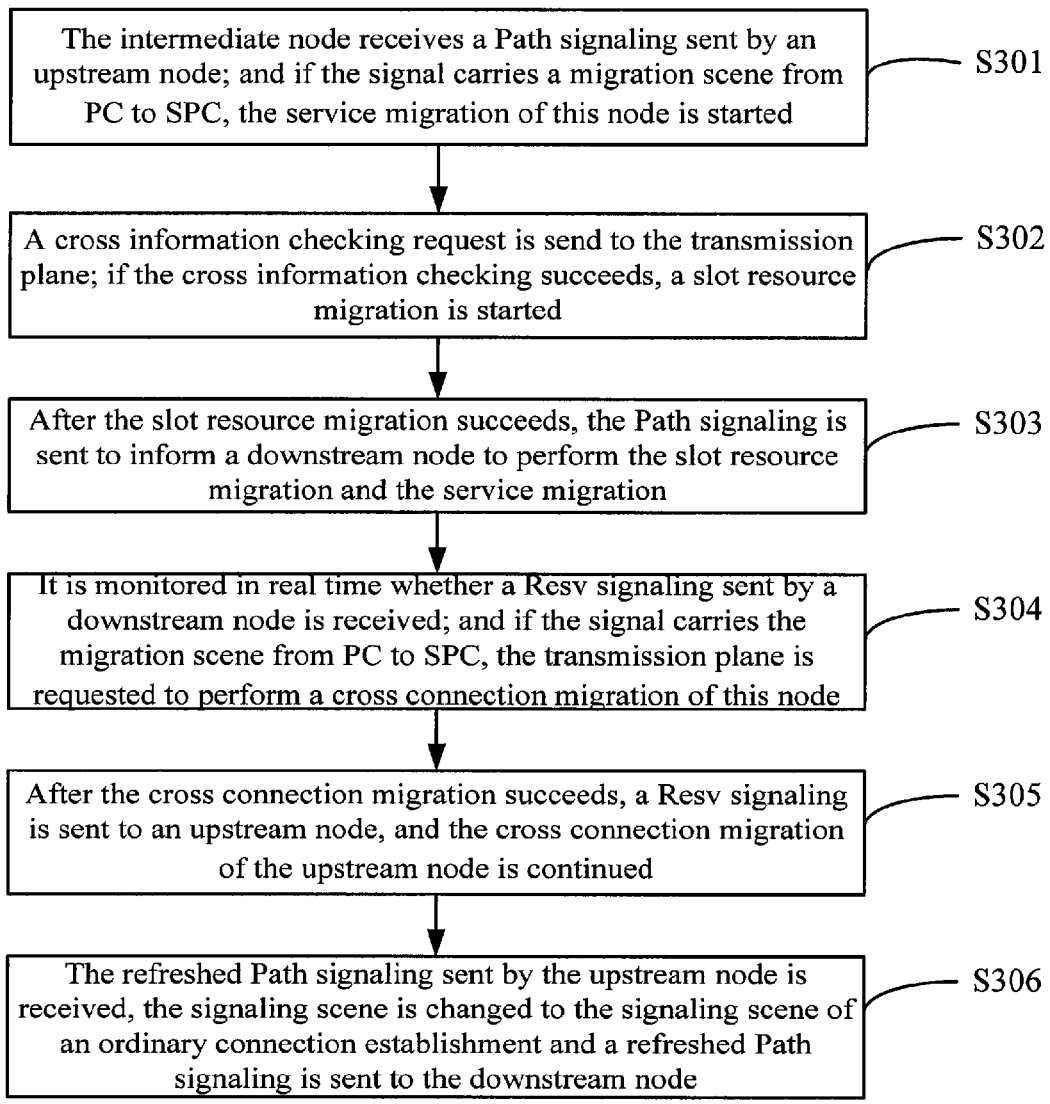
FIG. 3 is a flow chart of a method for an intermediate node migrating a service in the embodiments of the present invention.

As shown in FIG. 3, the migration process of a service intermediate node specifically comprises the following steps.

Step S301: The intermediate node receives a Path signaling sent by an upstream node, and judges whether to perform a connection establishment or a migration operation according to the signaling scene carried in the Path signaling; wherein if the carried signaling scene is a migration scene from PC to SPC, the service migration of this node is started.

Step S302: A cross information checking request is sent to the transmission plane; if the cross information checking succeeds, a slot resource migration is started; if the cross information checking fails, the migration process is stopped; and a Patherr signaling is sent to the upstream node to notify the failure of the migration.

Step S303: After the slot resource migration succeeds, the Path signaling is sent to inform a downstream node to perform the slot resource migration and the service migration; wherein the Path signaling carries a signaling scene of the slot resource migration from PC to SPC.

Step S304: It is monitored in real time whether a Resv signaling sent by the downstream node is received, and it is judged, according to the signaling scene carried in the Resv signaling, whether to perform a connection establishment or a cross connection migration; wherein if the carried signaling scene is a cross connection migration scene, the transmission plane is requested to perform the cross connection migration of this node.

Step S305: After the cross connection migration succeeds, the Resv signaling is sent to an upstream node, and the cross connection migration of the upstream node is continued.

Step S306: It is monitored in real time whether a refreshed Path signaling sent by the upstream node is received; wherein if it is determined to be yes, the current migration scene is changed to the signal scene of the ordinary connection establishment and the refreshed Path signaling is sent to the downstream node; and the Path signaling carries the signaling scene of the ordinary connection establishment.

Figure 4:
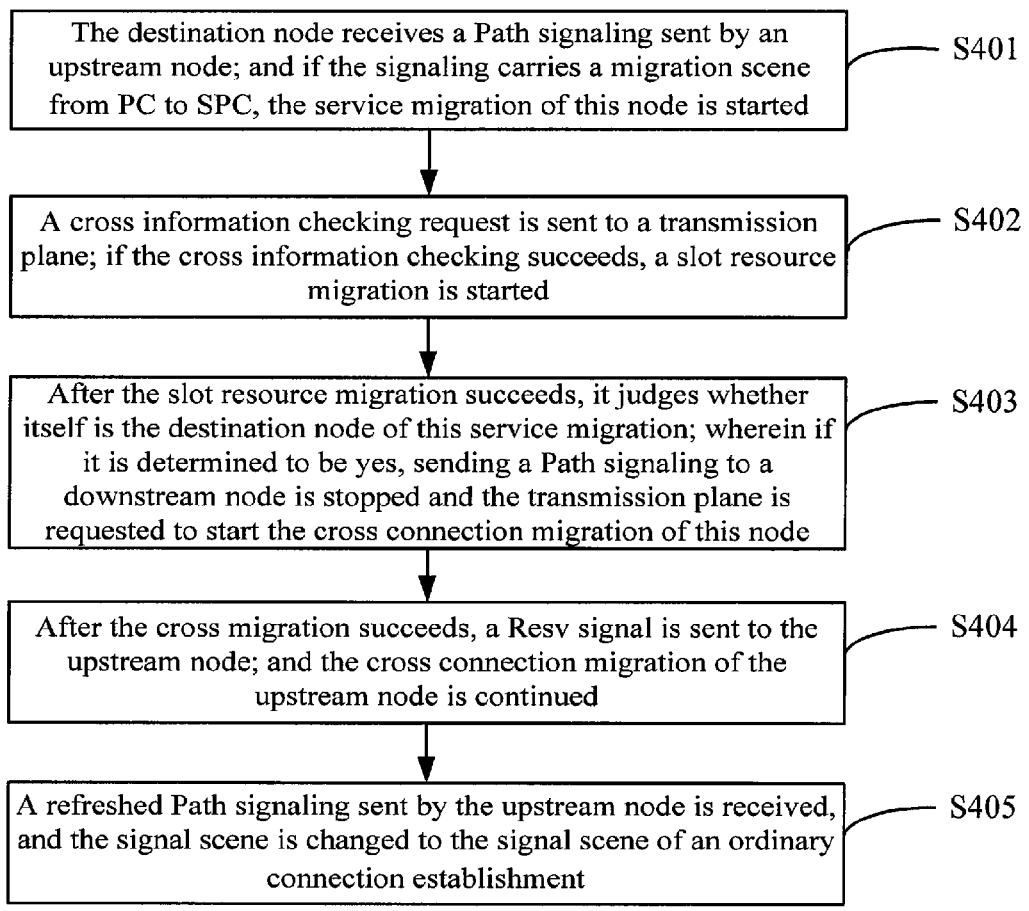
FIG. 4 is a flow chart of a method for a destination node migrating a service in the embodiments of the present invention.

As shown in FIG. 4, the migration process of a service destination node comprises the following steps.

Step S401: The destination node receives a Path signaling sent by an upstream node, and judges whether to perform a connection establishment or a migration operation according to a signaling scene carried in the Path signaling; wherein if the carried signaling scene is a migration scene from PC to SPC, the service migration of this node is started.

Step S402: A cross information checking request is sent to a transmission plane; if the cross information checking succeeds, a slot resource migration is started; if the cross information checking fails, the migration process is stopped; and a Patherr signaling is sent to an upstream node to notify the failure of the migration.

Step S403: After the slot resource migration succeeds, it judges whether itself is the destination node of this service migration; wherein if it is determined to be yes, sending a Path signaling to a downstream node is stopped and the transmission plane is requested to start the cross connection migration of this node.

Step S404: After the cross migration succeeds, a Resv signal is sent to an upstream node; and the cross connection migration of the upstream node is continued.

Step S405: It is monitored in real time whether a refreshed Path signaling sent by the upstream node is received; wherein if it is determined to be yes, the current migration scene is changed into the signal scene of an ordinary connection establishment.

Figure 5:
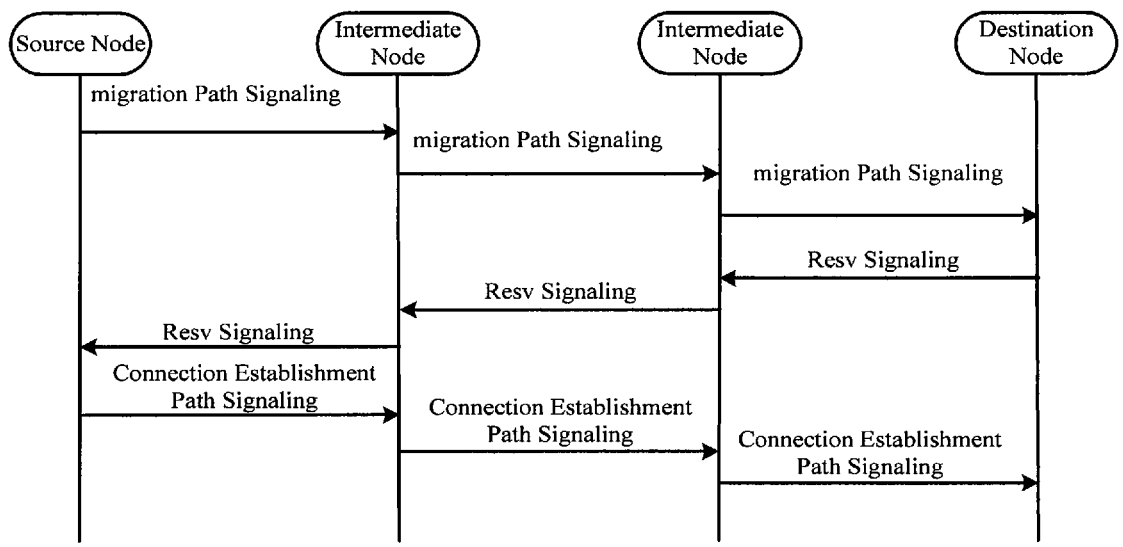
FIG. 5 is a flow chart of signaling transmission among each of the nodes during the completion of the migration from PC to SPC in an automatically switched optical network in the embodiments of the present invention.

Based on the migration operation of each of the above nodes, the flow chart of signaling transmission among each of the nodes during the completion of the migration form PC to SPC in the automatically switched optical network in the embodiment of the invention is illustrated as FIG. 5. The basic principle is that, the source node firstly performs the slot resource migration of its own after receiving the migration command, and then sends the Path signaling to the downstream node; when the downstream node receives the Path signaling which carries the migration scene, it performs the slot resource migration until the destination node in the downstream nodes completes the slot resource migration; after the destination node completes the slot resource migration, it returns the Resv signaling to the upstream node and notifies the upstream node to perform the cross connection migration until the source node sends the refreshed Path signaling to the downstream node after the source node completes the cross connection migration, so that the downstream node changes the current signal scene to the connection establishment scene, and thus the migration operation ends.

Figure 6:
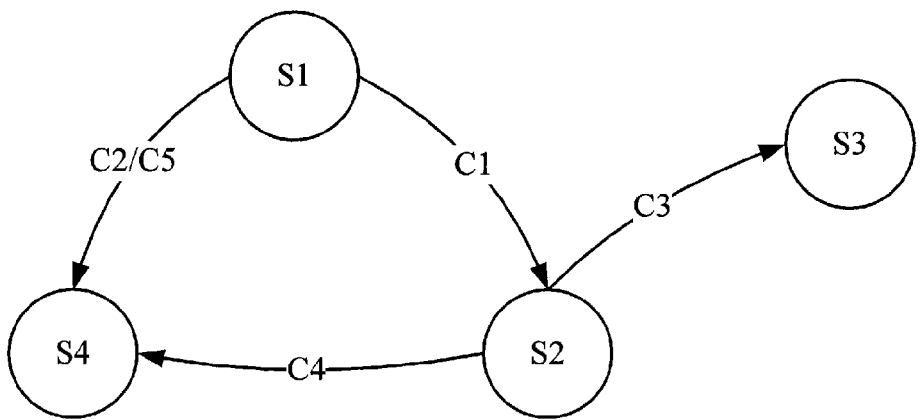
FIG. 6 is a state transition diagram oft the migration from PC to the SPC in the embodiments of the present invention.

The embodiment of the invention explains the state transition process during the migration so as to describe more clearly the realization process of the service migration in automatically switched optical network provided in the embodiment of the invention; specifically, as shown in FIG. 6, the following state is designed during the migration from PC to SPC to ensure the reliability of the migration.

S1 CONN_PC_SPC_BEGIN (begin the migration from PC to SPC), and C1—the slot migration from PC to SPC succeeds.

S2 CONN_PC_SPC_LABEL (the slot migration from PC to SPC ends), and C2—the slot migration from PC to SPC fails.

S3 CONN_PC_SPC_SUCCESS (the migration from PC to SPC is completed), C3—the cross migration from PC to SPC succeeds; and C5—the cross checking fails.

S4 CONN_PC_SPC_FAILURE (the migration from PC to SPC fails), C4—the cross migration from PC to SPC fails.

Figure 7:
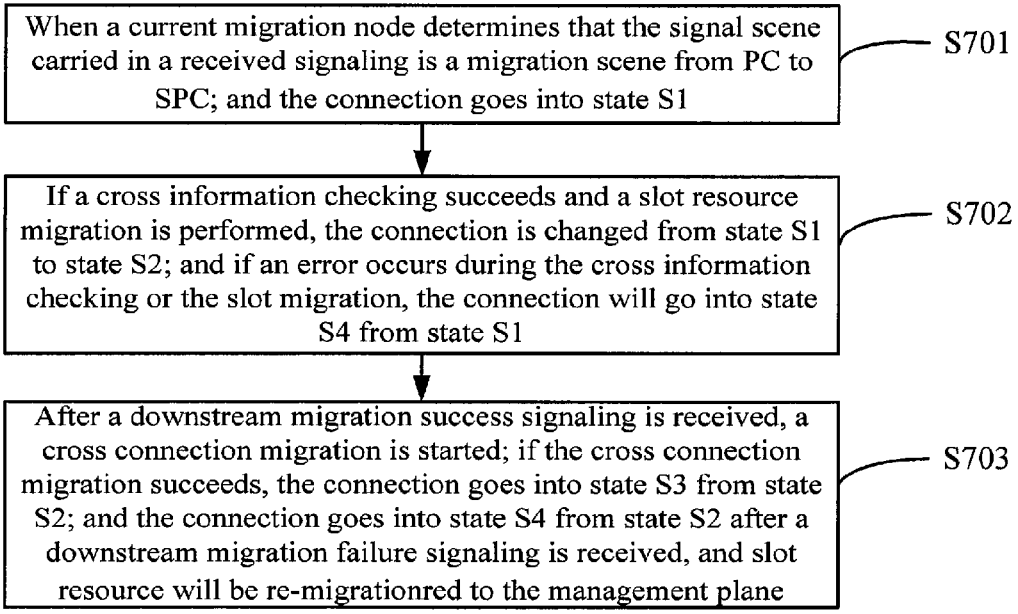
FIG. 7 is a flow chart of state control variation during migration process in the embodiments of the present invention.

Hereinafter the state control mechanism during the migration process will be described in details with reference to FIG. 6, as shown in FIG. 7, the following steps are specifically comprised.

Step S701: When a current migration node determines that the signal scene carried in a received signaling is a migration scene from PC to SPC; and the connection goes into state S1.

Step S702: If a cross information checking succeeds and a slot resource migration is performed, the connection is changed from state S1 to state S2; and if an error occurs during the cross information checking or the slot migration, the connection will go into state S4 from state S1.

Step S703: After a downstream migration success signaling is received, a cross connection migration is started; if the cross connection migration succeeds, the connection goes into state S3 from state S2; and the connection goes into state S4 from state S2 after a downstream migration failure signaling is received, and slot resource will be re-migrated to the management plane.

Figure 8:
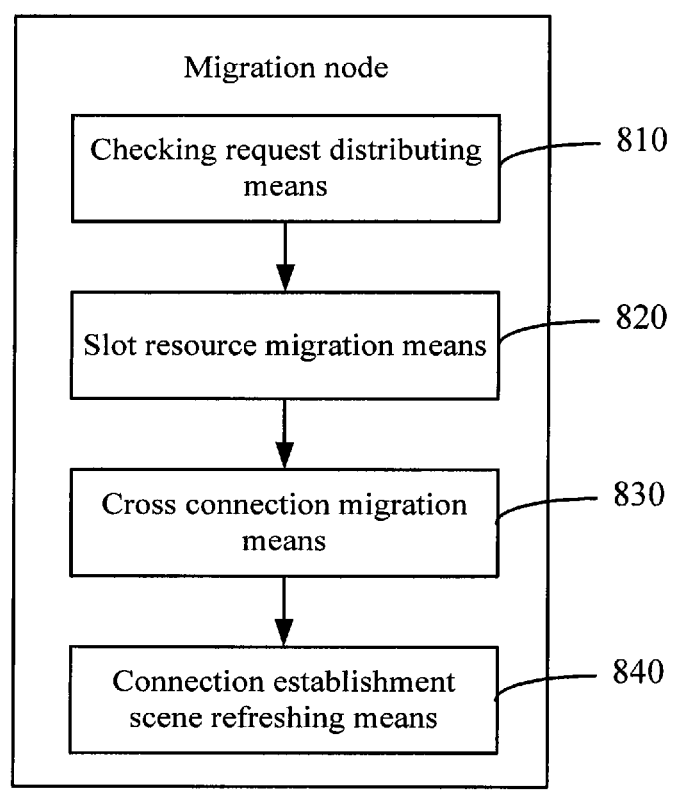
FIG. 8 is the structure chart of a migration node provided by the present invention.

The embodiment of the invention describes the method for service migration in an automatically switched optical network from the view of different nodes; the embodiment of the invention can be well compatible with an ordinary signaling establishment process by using a standard connection establishment signaling to perform a service migration. It carries out respectively a cross checking, a slot migration and a cross migration during different signaling phases, which improves the reliability of the migration from PC to SPC; and the reliability of the migration is further ensured by a strict state control and state refresh mechanism The present invention also provides a migration node; as shown in FIG. 8, the migration node specifically comprises the following means:

a checking request distributing means 810, configured to send a cross information checking request to a transmission plane when a migration indication message is received;

a slot resource migration means 820, configured to perform a slot resource migration when a cross information checking success message is received;

a cross connection migration means 830, configured to judge whether the migration node is a destination node of the present service migration; wherein if it is determined to be yes, a cross connection migration is performed directly; otherwise, the cross connection migration is performed after the indication signal, which is sent by a downstream node and carries a cross connection migration scene, is received.

In the above, when the migration node is a source node, the migration indication message received by the above checking request distributing means 810 is a migration command sent by a network administrator, wherein the migration command carries routing information; and when the migration node is an intermediate node or the destination node, the migration indication message received by the above checking request distributing means 810 is an indication signal which is sent by an upstream node and carries a slot resource migration scene.

Further, the checking request distributing means 810 is also configured to, when the migration node is the source node, inquire whether the routing information in the migration indication message is correct before the cross information checking request is sent to the transmission plane; wherein if it is determined to be yes, a creation of a control plane signaling is started.

The slot resource migration means 820 is also configured to, when the migration node is the source node or the intermediate node, send an indication signaling with a slot resource migration scene to the downstream node after the slot resource migration is performed.

The cross connection migration means 830 is also configured to, when the migration node is the source node, report a migration success message to a management plane after the cross connection migration is performed; and is also configured to, when the migration node is the intermediate node or the destination node, send an indication signaling with a cross connection migration scene to an upstream node after the cross connection migration is performed.

Specifically, the migration node provided by the present invention also includes the following means:

a connection establishment scene refreshing means 840, configured to change the current migration scene to a connection establishment scene.

The migration node provided by the present invention can be well compatible with an ordinary signaling establishment process by using a standard connection establishment signaling to perform the service migration. It carries out respectively a cross checking, a slot migration and a cross migration during different signaling phases, which improves the reliability of the migration from PC to SPC; and the reliability of the migration is further ensured by a strict state control and state refresh mechanism.

Apparently, those skilled in the art can make various modifications and variations to the present invention without breaking away from the spirit and scope of the present invention. Thus, if such modifications and variations of the present invention belong to the claims of the present invention and the scope of its equivalent techniques, the present invention also intends to include these modifications and variations.

What is claimed is:

1. A method of service migration in an automatically switched optical network, comprising:

when a migration node receiving a migration indication message, the migration node sending a cross information checking request to a transport plane;

when the migration node receiving a cross information checking success message, the migration node performing a slot resource migration; and the migration node judging whether itself is a destination node of the present service migration; wherein if it is determined to be yes, a cross connection migration is performed directly; otherwise, the cross connection migration is performed after the migration node receiving an indication signaling which is sent by a downstream node and carries a cross connection migration scene;

wherein the source node firstly performs the slot resource migration of its own after receiving the migration command, and then sends the Path signaling to the downstream node; when the downstream node receives the Path signaling which carries the migration scene, it performs the slot resource migration until the destination node in the downstream nodes completes the slot resource migration; after the destination node completes the slot resource migration, it returns the Resv signaling to the upstream node and notifies the upstream node to perform the cross connection migration until the source node sends the refreshed Path signaling to the downstream node after the source node completes the cross connection migration, the downstream node changes the current signal scene to the connection establishment scene, and the migration operation ends;

the following state is designed during the migration from PC to SPC to ensure the reliability of the migration:

when a current migration node determines that the signal scene carried in a received signaling is a migration scene from PC to SPC; and the connection goes into state S1;

if a cross information checking succeeds and a slot resource migration is performed, the connection is changed from state S1 to state S2; and if an error occurs during the cross information checking or the slot migration, the connection will go into state S4 from state S1;

after a downstream migration success signaling is received, a cross connection migration is started; if the cross connection migration succeeds, the connection goes into state S3 from state S2; and the connection goes into state S4 from state S2 after a downstream migration failure signaling is received, and slot resource will be re-migrated to the management plane;

wherein the state S1 represents the beginning of the migration from PC to SPC, the state S2 represents the end of the slot migration from PC to SPC ends, the state S3 represents the completion of the migration from PC to SPC, the state S4 represents the failure of the migration from PC to SPC.

2. The method according to claim 1, wherein when the migration node is a source node, the migration indication message is a migration command sent by a network administrator, wherein the migration command carries routing information; and when the migration node is an intermediate node or the destination node, the migration indication message is an indication signaling which is sent by an upstream node and carries a slot resource migration scene.

3. The method according to claim 1, wherein when the migration node is a source node, before the cross information checking request is sent to the transport plane, the method further comprises:

inquiring whether routing information in the migration indication messages is correct; wherein if it is determined to be yes, a creation of a control plane signaling is started.

4. The method according to claim 1, wherein when the migration node is a source node or an intermediate node, after the slot resource migration is performed, the method further comprises: sending the indication signaling with a slot resource migration scene to the downstream node.

5. The method according to claim 1, wherein when the migration node is a source node, the migration node reports a migration success message to a management plane after the cross connection migration is performed; and when the migration node is an intermediate node or the destination node, the migration node sends the indication signaling with the cross connection migration scene to an upstream node after the cross connection migration is performed.

6. The method according to claim 5, wherein after the cross connection migration is performed, the method further comprises:

the migration node changing the current migration scene to a connection establishment scene.

7. A migration node, comprising:

a checking request distributing means, configured to send a cross information checking request to a transport plane when the migration node receives a migration indication message;

a slot resource migration means, configured to perform a slot resource migration when the migration node receives a cross information checking success message; and a cross connection migration means, configured to judge whether the migration node is a destination node of the present service migration; wherein if it is determined to be yes, a cross connection migration is performed directly; otherwise, the cross connection migration is performed after the migration node receives an indication signaling which is sent by a downstream node and carries a cross connection migration scene;

wherein the source node firstly performs the slot resource migration of its own after receiving the migration command, and then sends the Path signaling to the downstream node; when the downstream node receives the Path signaling which carries the migration scene, it performs the slot resource migration until the destination node in the downstream nodes completes the slot resource migration; after the destination node completes the slot resource migration, it returns the Resv signaling to the upstream node and notifies the upstream node to perform the cross connection migration until the source node sends the refreshed Path signaling to the downstream node after the source node completes the cross connection migration, the downstream node changes the current signal scene to the connection establishment scene, and the migration operation ends;

the following state is designed during the migration from PC to SPC to ensure the reliability of the migration:

when a current migration node determines that the signal scene carried in a received signaling is a migration scene from PC to SPC; and the connection goes into state S1;

if a cross information checking succeeds and a slot resource migration is performed, the connection is changed from state S1 to state S2; and if an error occurs during the cross information checking or the slot migration, the connection will go into state S4 from state S1;

after a downstream migration success signaling is received, a cross connection migration is started; if the cross connection migration succeeds, the connection goes into state S3 from state S2; and the connection goes into state S4 from state S2 after a downstream migration failure signaling is received, and slot resource will be re-migrated to the management plane;

wherein the state S1 represents the beginning of the migration from PC to SPC, the state S2 represents the end of the slot migration from PC to SPC ends, the state S3 represents the completion of the migration from PC to SPC, the state S4 represents the failure of the migration from PC to SPC.

8. The migration node according to claim 7, wherein
when the migration node is a source node, the migration indication message received by the checking request distributing means is a migration command sent by a network administrator, wherein the migration command carries routing information; and when the migration node is an intermediate node or the destination node, the migration indication message received by the checking request distributing means is an indication signaling which is sent by an upstream node and carries a slot resource migration scene.

9. The migration node according to claim 7, wherein
the checking request distributing means is further configured to, when the migration node is a source node, inquire whether routing information in the migration indication message is correct before sending the cross information checking request to the transport plane; wherein if it is determined to be yes, a creation of a control plane signaling is started;

the slot resource migration means is further configured to, when the migration node is the source node or an intermediate node, send an indication signaling with a slot resource migration scene to the downstream node after the slot resource migration is performed; and the cross connection migration means is further configured to, when the migration node is the source node, report a migration success message to a control plane after the cross connection migration is performed; and the cross connection migration means is further configured to, when the migration node is the intermediate node or the destination node, send an indication signaling with a cross connection migration scene to an upstream node after the cross connection migration is performed.

10. The migration node according to claim 9, wherein the migration node also comprises:
a connection establishment scene refreshing means, configured to change the current migration scene to a connection establishment scene.

11. The method according to claim 2, wherein when the migration node is the source node, before the cross information checking request is sent to the transport plane, the method further comprises:
inquiring whether the routing information in the migration indication messages is correct; wherein if it is determined to be yes, a creation of a control plane signaling is started.

12. The method according to claim 2, wherein when the migration node is the source node or the intermediate node, after the slot resource migration is performed, the method further comprises: sending the indication signaling with a slot resource migration scene to the downstream node.

13. The method according to claim 2, wherein
when the migration node is the source node, the migration node reports a migration success message to a management plane after the cross connection migration is performed; and when the migration node is the intermediate node or the destination node, the migration node sends the indication signaling with the cross connection migration scene to the upstream node after the cross connection migration is performed.

14. The method according to claim 13, wherein after the cross connection migration is performed, the method further comprises:
the migration node changing the current migration scene to a connection establishment scene.

15. The migration node according to claim 8, wherein
the checking request distributing means is further configured to, when the migration node is the source node, inquire whether the routing information in the migration indication message is correct before sending the cross information checking request to the transport plane; wherein if it is determined to be yes, a creation of a control plane signaling is started;

the slot resource migration means is further configured to, when the migration node is the source node or the intermediate node, send the indication signaling with the slot resource migration scene to the downstream node after the slot resource migration is performed; and the cross connection migration means is further configured to, when the migration node is the source node, report a migration success message to a control plane after the cross connection migration is performed; and the cross connection migration means is further configured to, when the migration node is the intermediate node or the destination node, send an indication signaling with a cross connection migration scene to an upstream node after the cross connection migration is performed.

16. The migration node according to claim 15, wherein the migration node also comprises:
a connection establishment scene refreshing means, configured to change the current migration scene to a connection establishment scene.

* * * * *